United States Patent Office 3,247,125
Patented Apr. 19, 1966

3,247,125
STABILIZED MIXTURES OF ACID ANHYDRIDES
Marvin Z. Woskow, Houston, Tex., assignor to Petro-Tex Chemical Corporation, Houston, Tex., a corporation of Delaware
No Drawing. Filed Nov. 8, 1962, Ser. No. 236,436
11 Claims. (Cl. 252—182)

This invention relates to mixtures of acid anhydrides and relates more particularly to stabilized monobasic and polybasic acid anhydride mixtures that are liquid at low temperatures.

Epoxy resins, particularly polynuclear, polyhydroxyphenol type epoxy resins, are readily transformed from a liquid to tough, hard, thermoset solids by chemically reacting the epoxy resins with active materials known as hardeners or curing agents. Of late there has been considerable commercial interest in the use of polybasic acid anhydrides, and particularly in the use of certain mixtures of acid anhydrides as epoxy resin curing agents.

While there are advantages in curing epoxy resins with liquid acid anhydride rather than solid acid anhydrides or mixtures, there are also disadvantages. In most instances, the molden anhydride mixtures will begin to decompose almost immediately upon being mixed and particularly after being exposed to the atmosphere. This decomposition is generally evidenced by the formation of a precipitate which increases with time and creates serious problems in handling, storing and using the liquid anhydride mixtures. Further, solid anhydride curing mixtures require high temperatures to effectively cure the epoxy resin and thus limiting the usefulness as commercial curing agents. Epoxy resins cured under such conditions generally possess poor physical characteristics and present many operational limitations.

It is an object of this invention to provide stabilized liquid mixtures of monobasic or polybasic acid anhydrides. Another object of this invention is to provide stabilized mixtures of monobasic or polybasic acid anhydrides that are liquid at low temperatures and which remain stable even after prolonged exposure to the atmosphere. Another object is to provide a stable curing agent for epoxy resins. Still another object is to provide a process for stabilizing liquid mixtures of monobasic or polybasic acid anhydrides. A still further object of this invention is to provide stabilized liquid mixtures of maleic anhydride and derivatives of maleic anhydride that are liquid at temperatures below 30° C. Other objects will be apparent from the description which follows.

These objects are accomplished by combining two or more monobasic or polybasic acid anhydrides and an organic material containing at least one nitrogen atom and which has at least one active hydrogen atom. A variety of active hydrogen-containing nitrogenous compounds may be utilized. Although organic compounds containing 1 to 12 carbon atoms and 1 to 4 nitrogen atoms may be used, organic compounds containings 1 to 6 carbon atoms and 1 to 2 nitrogen atoms are usually preferred. Specific examples of such compounds include aliphatic primary and secondary amines such as methylamine, dimethylamine, ethylamine, tert-butylamine, di-n-amylamine, and the like; aliphatic diamines such as ethylenediamine, tetramethylenediamine, and the like; alkanolamines such as mono-ethanolamine, diethanolamine and the like; aliphatic acid amides such as acetamide, diacetamide, methylacetamide, propionamide, lauramide and the like; aromatic amines such as aniline, benzylamine, diphenylamine, and the like; and heterocyclic compounds such as pyrrole, succinimide and the like.

The amount of the stabilizing nitrogen compound that is required to stabilize a liquid acid anhydride mixture may be varied over a wide range. Generally good results have been obtained by mixing a liquid acid anhydride mixture and the stabilizing nitrogen compound in an amount of the stabilizer greater than 0.001 percent by weight of the anhydride mixture. Nitrogen stabilizing compounds in amounts as high as 10 percent by weight of the anhydride mixture and in some instances even more have been utilized but are not necessary. Generally, amounts between about 0.02 to 5 percent by weight of the anhydride mixture are employed; and amounts between about 0.8 to 3 percent by weight of the anhydride mixture have given excellent results and are preferred.

Typical linear and cyclic anhydrides that may be intermixed and to which the nitrogen-containing compound may be added generally contain from about 4 to 25 carbon atoms per molecule of acid anhydride and include, for example, the following: Aliphatic linear monobasic acid anhydrides such as propionic anhydride, acetic anhydride, acetyl butyrate and the like; aromatic linear monobasic acid anhydrides such as benzoic anhydride and the like; aliphatic cyclic polybasic acid anhydrides such as maleic anhydride, succinic anhydride, and the like, aromatic cyclic polybasic acid anhydrides such as trimellitic anhydride, pyromellitic anhydride, phthalic anhydride, and the like. A preferred group of cyclic acid anhydrides contain 4 to 8 carbon atoms; however, such anhydrides may contain additional carbon atoms attached to the cyclic member as alkyl radicals containing up to 12 carbon atoms. Certain cyclic dibasic acid anhydrides derived from maleic anhydride are of particular importance and include, for example, dodecenylsuccinic anhydride, hexahydrophthalic anhydride, tetrahydrophthalic anhydride, nonenylsuccinic anhydride, isatoic anhydride, chlorendic anhydride, and the like.

The acid anhydride mixtures that may be stabilized by this invention contain at least two acid anhydrides and are usually liquid at temperatures between about 0° C. to 30° C. Examples of specific anhydride mixtures include the following combinations: about 10 to 50 parts maleic anhydride and 50 to 90 parts hexahydrophthalic anhydride; about 10 to 27 parts tetrahydrophthalic anhydride and 73 to 90 parts hexahydrophthalic anhydride; about 20 to 40 parts chlorendic anhydride and 60 to 80 parts hexahydrophthalic anhydride; about 50 to 70 parts tetrahydrophthalic anhydride and 30 to 50 parts of maleic anhydride; a mixture of propionic acid anhydride and pyromellitic anhydride and the like.

The procedure for formulating stabilized liquid acid anhydride mixtures will usually consist in first melting the acid anhydrides separately or together and adding thereto the desired amount of the stabilizing nitrogen compound. The mixture, during or after mixing, is heated to a temperature above 80° C., and preferably to a temperature between about 90° C. and 150° C. The stabilized mixture is held at this elevated temperature until all noticeable traces of gaseous impurities have been evolved. Usually five to ten minutes at the elevated temperature is sufficient, although a longer period of time may be used. It is also advisable, although it is not essential, to purge the vapor space above the liquid anhydride mixture during the heating and cooling process with a dry inert gas or material substantially inert to the ingredients. The stabilized anhydride mixture may also be maintained under a dry inert atmosphere while in transit or storage. Dry inert materials that may be suitably employed include such materials as methane, helium, nitrogen, and the like.

Where the stabilized liquid anhydride is exposed to the atmosphere, in handling or storage, larger quantities of the nitrogen compound may be required. Since the stabilizing nitrogen compound may be consumed, in part, while functioning as stabilizing or inhibiting agents, the amount of the stabilizing nitrogen compound initially introduced depends, in part, on the length of time as well as the conditions under which the anhydrides are to be stored, and additional amounts may be required to be added during long or exposed storage.

The effect of adding a specified amount of particular stabilizing nitrogen-containing compounds to a low-melting or eutectic mixture of polybasic anhydrides is demonstrated in the following examples.

*Example 1*

Three low-melting liquid acid anhydride samples were prepared by melting together approximately 83 grams of hexahydrophthalic anhydride and 15 grams of tetrahydrophthalic anhydride in three separate containers. 2 grams of acetamide was added to one of the liquid anhydride samples and 2 grams of di-n-amylamine was added to the second sample. The third sample, serving as the control, contained no stabilizer. All three samples were shaken and then heated to about 150° C. and maintained at this elevated temperature for about 10 minutes and the containers then were capped. The three samples were then allowed to cool and were stored over an extended period of time. The samples were periodically examined for signs of decomposition. Over a period of three months, the samples containing the acetamide and di-n-amylamine gave no visible indication of decomposition. The control sample began forming a white insoluble precipitate almost immediately after being capped, and after about 100 hours, substantial quantities of this white insoluble substance had precipitated. At the end of a three-month storage period at a temperature of about 23° C., the anhydride samples containing the acetamide and di-n-amylamine were solidified by cooling the anhydride mixtures to about 5° C. After about 24 hours the solid anhydride mixtures were liquified by heating and examined. Visual examination of the samples gave no indication of anhydride decomposition even after solidification and remelting.

Other low-melting or eutectic acid anhydride mixtures may be prepared by the procedure described above. In each case the addition of small amounts of a stabilizing nitrogen-containing compound having at least one active hydrogen atom, or mixtures of such compounds produced a stabilized low-melting or eutectic anhydride mixture. For examples, a liquid mixture consisting of 1,4,5,6,7,7-hexachlorobicyclic-(2,2,1)-5-heptane-2,3-dicarboxylic anhydride, hexahydrophthalic anhydride and about 2 weight percent of ethanolamine prepared by heating to about 150° C. and being maintained at that temperature for about 5 minutes before being capped and cooled to room temperature. No visible signs of decomposition appeared after several months.

*Example 2*

Another series of tests were run in which a variety of stabilizing nitrogen-containing compounds were tested. Seven low-melting eutectic mixtures consisting in each case of 83 grams of hexahydrophthalic anhydride and 15 grams of tetrahydrophthalic anhydride were prepared as described in Example 1. To each of the first six mixtures a specific stabilizing nitrogen-containing compound was added. These stabilizing nitrogen compounds were: (1) ethanolamine, (2) secondary butylamine, (3) aniline, (4) di-n-amylamine, (5) ethylenediamine and (6) acetamide. No stabilizing compound was added to the remaining eutectic sample. All seven samples were heated to about 150° C. and maintained at this temperature for about 5 minutes. After the seven samples had been cooled to room temperature, the samples were exposed to the atmosphere at a temperature of 72° F. and relative humidity of 75 percent. The control sample began forming a white precipitate almost immediately while the six samples containing the stabilizing nitrogen compound showed no indication of decomposition.

*Example 3*

Six samples of an anhydride mixture consisting of 83 grams of tetrahydrophthalic anhydride and 15 grams of hexahydrophthalic anhydride each were prepared by melting together the two ingredients. To each of five of these samples, 2 grams of the following different nitrogen compounds were stirred in: (1) di-n-amylamine, (2) ethylenediamine, (3) ethanolamine, (4) acetamide, and (5) secondary butylamine. The remaining sample, which contained no stabilizing compound, served as the control. To each of the prepared samples, 110 grams of a commercial epoxy resin, Epon 828 (a reaction product of epichlorohydrin with bis-phenol A), was added and the mixture cured at a temperature of about 300° F. The sample containing no stabilizing compound required about 24 hours at 300° F. to cure while the five samples containing 2 grams of the nitrogen stabilizing compound cured more rapidly. In each case where the sample contained 2 percent by weight of the nitrogen stabilizing compound, the epoxy resins produced were of high quality.

When the above examples are repeated with eutectic mixtures of 10 to 90 percent maleic anhydride with tetrahydrophthalic anhydride, as well as 50 to 70 percent of maleic anhydride with hexahydrophthalic anhydride, similar improved results are obtained.

The term "low-melting" is meant to include any anhydride mixture which contains two or more polybasic acid anhydrides, which when combined have a melting point below one of the combined polybasic acid anhydrides.

Liquid epoxy resins are produced by combining bisphenol - A[2,2 - bis(hydroxyphenyl)propane] with epichlorohydrin in the presence of sodium hydroxide which may then be hardened or cured into tough, hard, thermoset solids by adding thereto specific amounts of acid anhydrides. Epoxy resins and the curing thereof are described in "Epoxy Resins, Their Application and Technology," Lee and Neville, McGraw-Hill Book Co., Inc. (1957), with particular reference to pages 3–14 and 115–139.

Stabilized low-melting or eutectic mixtures of polybasic acid anhydrides are useful not only in the production of epoxy resins but also in the production of polyesters as well as the production of other polymer formulations.

I claim:

1. A stabilized composition of matter consisting essentially of a mixture of at least two cyclic dibasic acid anhydrides containing 4 to 8 carbon atoms and which are liquid at temperatures below 30° C. and an aliphatic amine containing 1 to 5 carbon atoms, 1 to 2 nitrogen atoms and at least one active amine hydrogen atom, said amine being present in an amount between about 0.02 to 5 percent by weight of said anhydride mixture.

2. A stabilized composition of matter consisting essentially of a mixture of at least two cyclic dibasic acid anhydrides containing 4 to 8 carbon atoms and which are liquid at temperatures below 30° C. and an alkanolamine selected from the group consisting of ethanolamine and diethanolamine, said alkanolamine being present in an amount between about 0.8 to 3 percent by weight of said anhydride mixture.

3. A stable cyclic dibasic acid anhydride mixture which is liquid at temperatures below 30° C. consisting essentially of about 10 to 50 parts of maleic anhydride and 50 to 90 weight parts of hexahydrophthalic anhydride and an aliphatic amine containing at least 1 to 5 carbon atoms, 1 to 2 nitrogen atoms and an active amine hydrogen atom in an amount between about 0.8 to 3 percent by weight of said anhydride mixture.

4. A stable dibasic acid anhydride mixture which is liquid at temperatures below 30° C. consisting essentially of 10 to 27 weight parts of tetrahydrophthalic anhydride and about 73 to 90 weight parts of hexahydrophthalic anhydride and an aliphatic amine containing 1 to 5 carbon atoms, 1 to 2 nitrogen atoms and at least one active amine hydrogen atom in an amount between about 0.8 to 3 percent by weight of said anhydride mixture.

5. A stabilized composition of matter consisting essentially of a mixture of at least two cyclic dibasic acid anhydrides containing 4 to 8 carbon atoms and which are liquid at temperatures below 30° C. and an aliphatic amide containing 1 to 6 carbon atoms, and at least one active amide hydrogen atom, said amide being present in an amount between about 0.8 to 3 percent by weight of said anhydride mixture.

6. A stable cyclic dibasic acid anhydride mixture which is liquid at temperatures below 30° C. consisting essentially of about 10 to 50 parts of maleic anhydride and 50 to 90 weight parts of hexahydrophthalic anhydride and mono-ethanolamine in an amount between 0.8 to 3 percent by weight of said anhydride mixture.

7. A stable cyclic dibasic acid anhydride mixture which is liquid at temperatures below 30° C. consisting essentially of about 10 to 50 parts of maleic anhydride and 50 to 90 weight parts of hexahydrophthalic anhydride and acetamide in an amount between 0.8 to 3 percent by weight of said anhydride mixture.

8. A stable cyclic dibasic acid anhydride mixture which is liquid at temperatures below 30° C. consisting essentially of about 10 to 50 parts of maleic anhydride and 50 to 90 weight parts of hexahydrophthalic anhydride and di-n-amylamine in an amount between 0.8 to 3 percent by weight of said anhydride mixture.

9. A stable dibasic acid anhydride mixture which is liquid at temperatures below 30° C. consisting essentially of 10 to 27 weight parts of tetrahydrophthalic anhydride and about 73 to 90 weight parts of hexahydrophthalic anhydride and mono-ethanolamine in an amount between about 0.8 to 3 percent by weight of said anhydride mixture.

10. A stable dibasic acid anhydride mixture which is liquid at temperatures below 30° C. consisting essentially of 10 to 27 weight parts of tetrahydrophthalic anhydride and about 73 to 90 weight parts of hexahydrophthalic anhydride and acetamide in an amount between about 0.8 to 3 percent by weight of said anhydride mixture.

11. A stable dibasic acid anhydride mixture which is liquid at temperatures below 30° C. consisting essentially of 10 to 27 weight parts of tetrahydrophthalic anhydride and about 73 to 90 weight parts of hexahydrophthalic anhydride and di-n-amylamine in an amount between about 0.8 to 3 percent by weight of said anhydride mixture.

References Cited by the Examiner

UNITED STATES PATENTS

| | | | |
|---|---|---|---|
| 2,949,441 | 8/1960 | Newey | 260—47 |
| 3,035,001 | 5/1962 | Tinsley et al. | 260—18 |
| 3,078,235 | 2/1963 | Bowman et al. | 252—182 |

OTHER REFERENCES

"Alkanolamines and Morpholines," Union Carbide Chemical Co., 1960, page 3.

JULIUS GREENWALD, *Primary Examiner.*

ALBERT T. MEYERS, *Examiner.*